United States Patent
Chung et al.

(10) Patent No.: US 12,085,968 B2
(45) Date of Patent: Sep. 10, 2024

(54) APPARATUS FOR CONTROLLING GAS FLOW RATES AT MULTI-PORTS

(71) Applicant: ELECTRONICS AND TELECOMMUNICATIONS RESEARCH INSTITUTE, Daejeon (KR)

(72) Inventors: Kwang Hyo Chung, Daejeon (KR); Chang Geun Ahn, Daejeon (KR); Do Hyun Kim, Daejeon (KR); Seung Hwan Kim, Daejeon (KR); Hyung Wook Noh, Daejeon (KR); Hwin Dol Park, Daejeon (KR); Yong Won Jang, Daejeon (KR); Jae Hun Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 156 days.

(21) Appl. No.: 17/716,889

(22) Filed: Apr. 8, 2022

(65) Prior Publication Data
US 2023/0176594 A1 Jun. 8, 2023

(30) Foreign Application Priority Data

Dec. 3, 2021 (KR) .................. 10-2021-0172287

(51) Int. Cl.
G05D 7/06 (2006.01)
F16L 41/00 (2006.01)
F16L 41/03 (2006.01)

(52) U.S. Cl.
CPC .......... G05D 7/0664 (2013.01); F16L 41/008 (2013.01); F16L 41/03 (2013.01)

(58) Field of Classification Search
CPC ... G05D 7/0664; G01N 33/022; F16L 41/008; F16L 41/03
See application file for complete search history.

(56) References Cited

U.S. PATENT DOCUMENTS 6,422,264 B2 * 7/2002 Ohmi .................. G05D 7/0658
700/282
6,686,594 B2 2/2004 Ji et al.
(Continued)

FOREIGN PATENT DOCUMENTS

JP 2021-18153 A 2/2021
KR 10-1002948 B1 12/2010
(Continued)

*Primary Examiner* — Michael R Reid

(57) ABSTRACT

Provided is a multi-port gas flow rate control apparatus. The multi-port gas flow rate control apparatus includes a gas supply chamber configured to supply a measurement gas input through one gas inflow channel while allowing the measurement gas to diverge into a plurality of flows, a plurality of gas divergence flow channels each having one side connected to the gas supply chamber and configured to transfer the measurement gas flowing through the gas supply chamber to a plurality of gas sensors, respectively, and a gas measurement chamber configured to accommodate the plurality of gas sensors, including the plurality of gas divergence flow channels configured to connect to the gas supply chamber to the plurality of gas sensors to transfer a gas outflow diverging through the gas supply chamber to the plurality of accommodated gas sensors, and configured to discharge the gas outflow sensed by the plurality of gas sensors.

6 Claims, 13 Drawing Sheets

(56) References Cited

U.S. PATENT DOCUMENTS

| | | | | |
|---|---|---|---|---|
| 6,839,966 | B2* | 1/2005 | Kakinuma | F16L 41/03 |
| | | | | 29/237 |
| 9,178,032 | B2 | 11/2015 | Yu et al. | |
| 10,183,289 | B2* | 1/2019 | Sanroma | B01L 3/502 |
| 10,283,391 | B2 | 5/2019 | Hyon et al. | |
| 10,691,145 | B2 | 6/2020 | Bauer | |
| 10,698,426 | B2* | 6/2020 | Ding | G01F 1/36 |
| 11,053,591 | B2 | 7/2021 | Ma et al. | |
| 11,346,505 | B2* | 5/2022 | Kuriki | F16L 41/03 |

FOREIGN PATENT DOCUMENTS

| | | | |
|---|---|---|---|
| KR | 10-1275507 B | 6/2013 | |
| KR | 20-0469742 Y1 | 11/2013 | |
| KR | 10-1652469 B | 8/2016 | |
| KR | 10-2054150 B1 | 12/2019 | |
| KR | 10-2147162 B1 | 8/2020 | |
| KR | 10-2150880 B | 9/2020 | |
| KR | 10-2235964 B1 | 4/2021 | |
| WO | WO-2020085033 A1 * | 4/2020 | F16K 27/00 |

\* cited by examiner

FIG. 4A

| L(mm) | Q(kg/s) | Q/Q50 | Q/Q50 THEORETICAL | |
|---|---|---|---|---|
| 50 | -8.43283E-07 | 1 | 1 | |
| 100 | -4.49371E-07 | 0.533 | 0.5 | Re = 160 |
| 150 | -3.03559E-07 | 0.360 | 0.33 | |
| 200 | -2.28787E-07 | 0.271 | 0.25 | |

FIG. 4B

| L(mm) | Q(kg/s) | Q/Q50 | Q/Q50 THEORETICAL | |
|---|---|---|---|---|
| 50 | -8.71265E-08 | 1 | 1 | |
| 100 | -4.39609E-08 | 0.505 | 0.5 | Re = 15 |
| 150 | -2.93678E-08 | 0.337 | 0.33 | |
| 200 | -2.20449E-08 | 0.253 | 0.25 | |

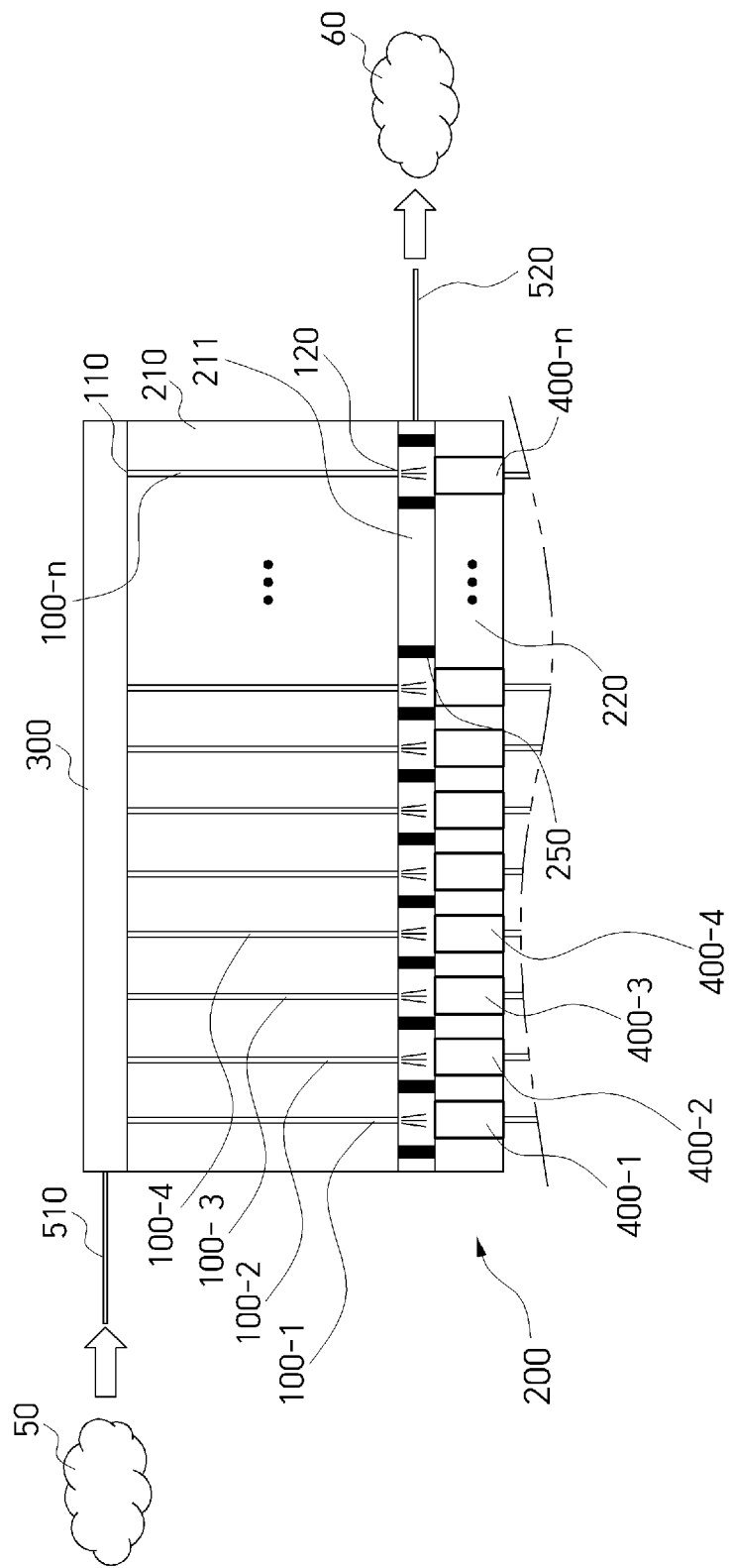

APPARATUS FOR CONTROLLING GAS FLOW RATES AT MULTI-PORTS

CROSS-REFERENCE TO RELATED APPLICATION

This application claims priority to and the benefit of Korean Patent Application No. 10-2021-0172287, filed on Dec. 3, 2021, the disclosure of which is incorporated herein by reference in its entirety.

BACKGROUND

1. Field of the Invention

The present invention relates to a flow rate control apparatus for sensing a gas, and more particularly, to an apparatus configured to supply gases at different flow rates to a plurality of gas sensors by controlling flow resistance.

2. Discussion of Related Art

Gas sensors to which a variety of principles are applied to analyze types and concentrations of gases have been developed.

For example, as chemical gas sensors, there are a chemoresistive metal oxide semiconductor (MOS) gas sensor, an electrochemical (EC) gas sensor, a polymer sensor, a gas chromatography (GC) sensor, a chemiluminescence sensor, and the like. As optical gas sensors, there are a photoionization detector (PID), a photoacoustic spectroscopy sensor, an infrared (IR) spectral photometer, a photoluminescence sensor, a surface enhanced Raman scattering (SERS) spectrometry sensor, and the like. As a representative example of electrical gas sensors, there is a chemical field-effect transistor (ChemiFET) sensor. As mass-based gas sensors, there are an ion mobility spectrometry (IMS) gas sensor, a mass spectroscopy (MS) sensor, a quartz crystal microbalance (QCM) sensor, a micro cantilever sensor, a surface acoustic wave (SAW) sensor, a capacitive micromachined ultrasound transducer (CMUT) sensor, and the like.

Since a variety of gas sensors require different driving and control and measurement signal conversion, conventional gas sensors have been developed as independent devices to sense gases. Recently, due to development of machine learning and artificial intelligence, it has been attempted to synthetically analyze measurement results of a variety of gas sensors so as to increase sensitivity and specification of gas measurement.

Particularly, research and development for equipping one device with a variety of gas sensors is being conducted.

As described above, to unify a variety of gas sensors in one device, a method of integrating the different driving and control and measurement signal conversion is required.

However, the variety of gas sensors may have different optimum flow rate ranges for measuring gases and may need adjusting of a variety of gas flow rates.

In order to supply and control a variety of gas flow rates for each sensor, as a current technique, a flow rate controller and a pump are necessarily provided for each gas sensor.

In this case, a unified device becomes complicated, expensive and large. Accordingly, a technique for simplifying the unified device is required but there is no related art.

SUMMARY OF THE INVENTION

The present invention is directed to providing an apparatus for distributing gases supplied from one inlet to a plurality of sensors at different flow rates.

To this end, an apparatus for simply controlling flow rates of supplied gases by shapely adjusting flow resistance in flow channels through which gases are supplied to a plurality of sensors is provided.

The present invention is directed to providing an apparatus for adjusting a flow rate by simply changing the flow resistance of the flow channel.

Aspects of the present invention are not limited to the above-stated aspects and other unstated aspects of the present invention will be understood by those skilled in the art from the following disclosure.

According to an aspect of the present invention, there is provided a multi-port gas flow rate control apparatus includes a gas supply chamber configured to supply a measurement gas input through one gas inflow channel while allowing the measurement gas to diverge into a plurality of flows, a plurality of gas divergence flow channels each having one side connected to the gas supply chamber and configured to transfer the measurement gas flowing through the gas supply chamber to a plurality of gas sensors, respectively, and a gas measurement chamber configured to accommodate the plurality of gas sensors, including the plurality of gas divergence flow channels configured to connect to the gas supply chamber to the plurality of gas sensors to transfer a gas outflow diverging through the gas supply chamber to the plurality of accommodated gas sensors, and configured to discharge the gas outflow sensed by the plurality of gas sensors.

The plurality of gas divergence flow channels may be configured to have different inner diameters.

The plurality of gas divergence flow channels may be configured to have different lengths.

Each of the plurality of gas divergence flow channels may have an inner diameter of 0.1 to 1 mm.

A length of the gas divergence flow channels configured to connect the gas supply chamber to the gas measurement chamber may be a minimum characteristic length of 5 mm or more.

According to another aspect of the present invention, there is provided a multi-port gas flow rate control apparatus including a gas supply chamber configured to receive a measurement gas through one gas inflow channel and to supply the measurement gas while allowing the measurement gas to diverge into a plurality of gas sensors and a gas measurement chamber including a lower structure including a plurality of accommodation holes configured to accommodate the plurality of gas sensors and an upper structure in which a plurality of gas divergence flow channel holes configured to connect the gas supply chamber to the accommodation holes of the lower structure so as to allow the measurement gas supplied through the gas supply chamber to diverge and be supplied to the plurality of gas sensors accommodated in the lower structure.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIGS. 4A and 4B are tables illustrating results of comparing the theoretical formula and computed simulation results for flow rates of flow channels having different lengths in one embodiment of the present invention;

FIG. 5 is a cross-sectional view of a multi-port gas flow rate control apparatus in which inner diameters of flow channels are variously changed according to another embodiment of the present invention;

DETAILED DESCRIPTION OF EXEMPLARY EMBODIMENTS

Advantages and features of the present invention and methods for achieving them will be made clear from embodiments described below in detail with reference to the accompanying drawings. However, the present invention is not limited to the embodiments which will be described below and may be implemented in various different forms. It should be noted that the embodiments are provided merely for completing the disclosure of the present invention and allowing one of ordinary skill in the art to understand the complete scope of the present invention and the present invention will be defined by the scope of the claims.

Meanwhile, terms used herein are for the purpose of describing the embodiments and are not intended to limit the present invention. Throughout the specification, the singular forms as well the plural forms as well unless the context clearly indicates otherwise. The terms "comprises" and/or "comprising" do not exclude the presence or addition of one or more other components, stages, operations, and/or elements in addition to stated components, stages, operations, and/or elements.

Figure 1:
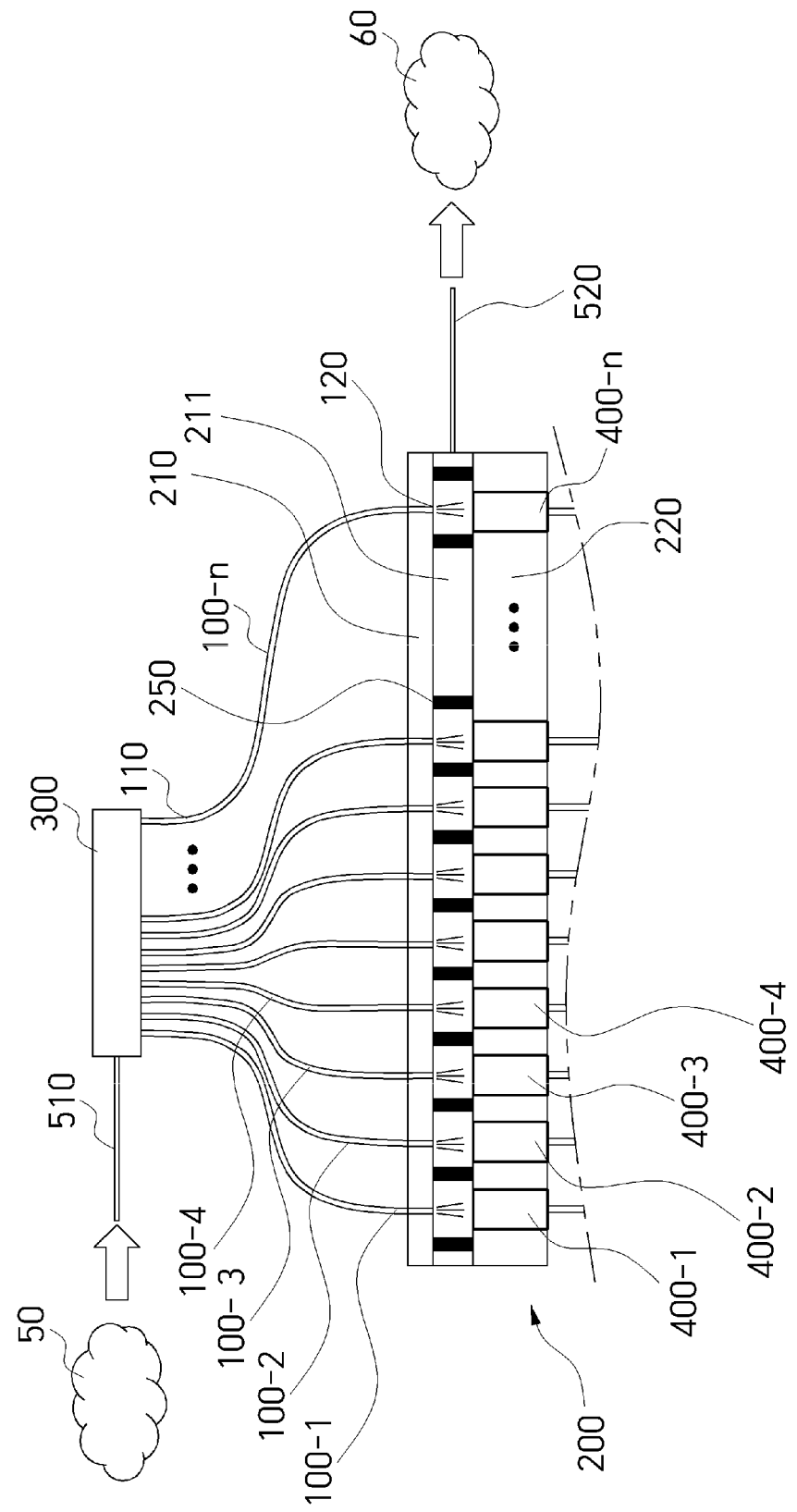
FIG. 1 is a cross-sectional view of a multi-port gas flow rate control apparatus according to the present invention.

FIG. 1 is a cross-sectional view of a multi-port gas flow rate control apparatus according to the present invention.

As shown in FIG. 1, the multi-port gas flow rate control apparatus according to one embodiment of the present invention includes a plurality of gas divergence flow channels 100-1 to 100-$n$, a gas measurement chamber 200, and a gas supply chamber 300.

The plurality of gas divergence flow channels 100-1 to 100-$n$ which have one ends connected to the gas supply chamber 300 so as to transfer a measurement gas 50 which flows in through the gas supply chamber 300 to a plurality of gas sensors 400-1 to 400-$n$. That is, as shown in FIG. 1, in the case of the plurality of gas divergence flow channels 100-1 to 100-$n$, one end of each of the plurality of gas divergence flow channels 100-1 to 100-$n$ is a flow channel inlet portion 110 fixedly installed on one surface of the gas supply chamber 300 so as to allow the measurement gas 50 to diverge and flow therethrough and the other end thereof is a flow channel outlet portion 120 and located on a ceiling part on an upper side of the gas measurement chamber 200.

Meanwhile, the flow channel inlet portion 110 of each of the gas divergence flow channels 100-1 to 100-$n$ is installed on one sidewall of the gas supply chamber 300 and may be inserted into the gas supply chamber 300.

Also, the flow channel outlet portion 120 of each of the gas divergence flow channels 100-1 to 100-$n$ is installed on the ceiling part of the upper side of the gas measurement chamber 200 and may protrude and be inserted into the gas measurement chamber 200.

The gas measurement chamber 200 accommodates each of the plurality of gas sensors 400-1 to 400-$n$ and is connected each of the plurality of gas divergence flow channels 100-1 to 100-$n$ to transfer the measurement gas 50 supplied from the gas supply chamber 300 to the plurality of gas sensors 400-1 to 400-$n$ through the plurality of gas divergence flow channels 100-1 to 100-$n$. Subsequently, the gas measurement chamber 200 integrates and discharges waste gases 60 sensed by the gas sensors 400-1 to 400-$n$.

The gas measurement chamber 200 is formed by combining an upper structure 210 and a lower structure 220.

In the upper structure 210, the flow channel outlet portions 120 of the plurality of gas divergence flow channels 100-1 to 100-$n$ are fixedly installed, a measurement space 211 into which the measurement gas 50 flowing in through the gas divergence flow channels 100-1 to 100-$n$ may flow is formed, and a channel 230 configured to communicate with the measurement space 211 is formed in a side surface to allow the measurement gas 50 flowing into the measurement space 211 to be discharged after being measured by the gas sensors 400-1 to 400-$n$.

The lower structure 220 includes an accommodation portion configured to accommodate the plurality of gas sensors 400-1 to 400-$n$.

Meanwhile, the measurement space 211 is formed by combining the upper structure 210 and the lower structure 220. Also, a bottom surface of the gas sensor 400 accommodated in the accommodation portion of the lower structure 220 may be exposed to the measurement space 211.

Alternatively, measurement sensor portions of the gas sensors 400-1 to 400-n may protrude into the gas measurement chamber 200.

Gas outflows flowing from the n number of flow channel outlet portions 120, as shown in FIG. 1, are supplied to the n number of gas sensors 400-1 to 400-n and move, after sensed by the gas sensors 400-1 to 400-n, to a gas outflow channel 520 to be discarded.

Meanwhile, in the measurement space 211, a diaphragm structure 250 may be installed. This may be provided to spatially separate a plurality of flow channel outlet portions and provide an independent space to each of the gas sensors 400 so as to minimize an influence on adjacent gas flows.

The gas outflow flowing into the measurement space 211 separated by a diaphragm may be moved to the gas outflow channel 520 through a side channel (not shown in FIG. 1, refer to FIGS. 6A and 6B) additionally installed on a side of the measurement space 211.

The gas supply chamber 300 receives the measurement gas 50 through one gas inflow channel 510 and allows the measurement gas 50 to diverge into the plurality of gas sensors to supply the measurement gas 50 to the gas sensors 400-1 to 400-n accommodated in the gas measurement chamber 200.

Figure 2A:
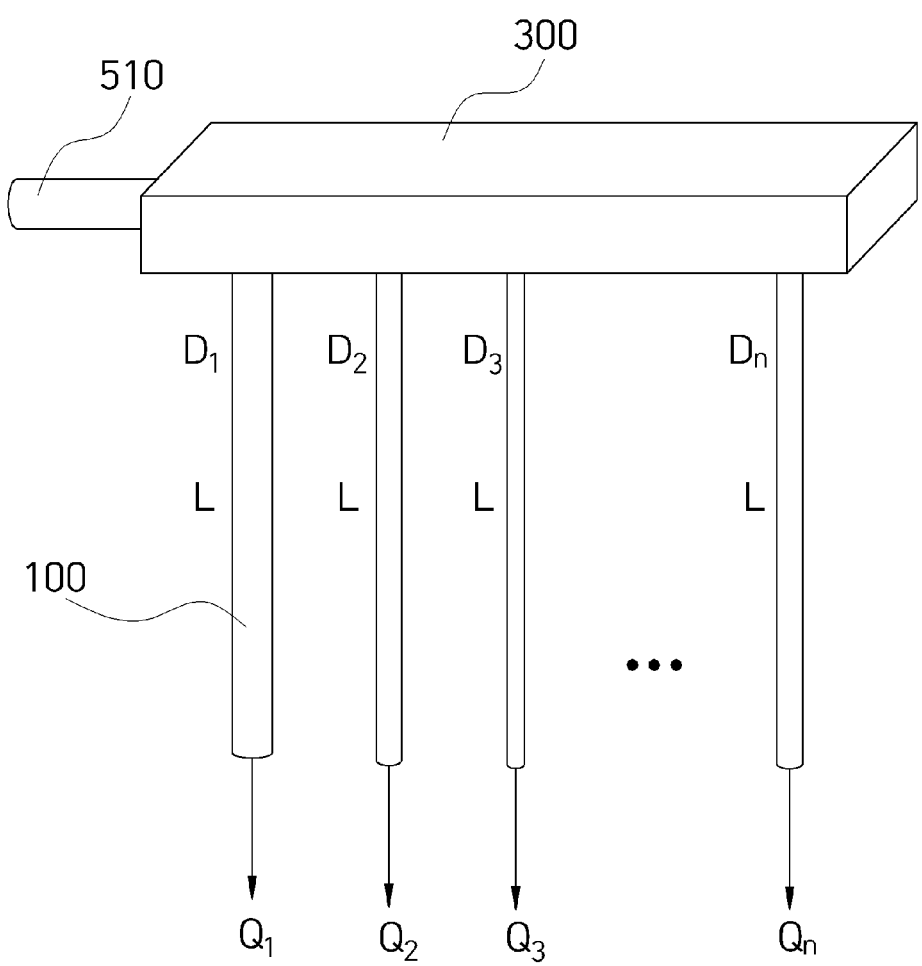
FIG. 2A is a conceptual view illustrating flow rates according to gas divergence flow channels having different diameters in the multi-port gas flow rate control apparatus according to one embodiment of the present invention.

FIG. 2A is a conceptual view illustrating flow rates according to the gas divergence flow channels having different diameters in the multi-port gas flow rate control apparatus according to one embodiment of the present invention.

Figure 2B:
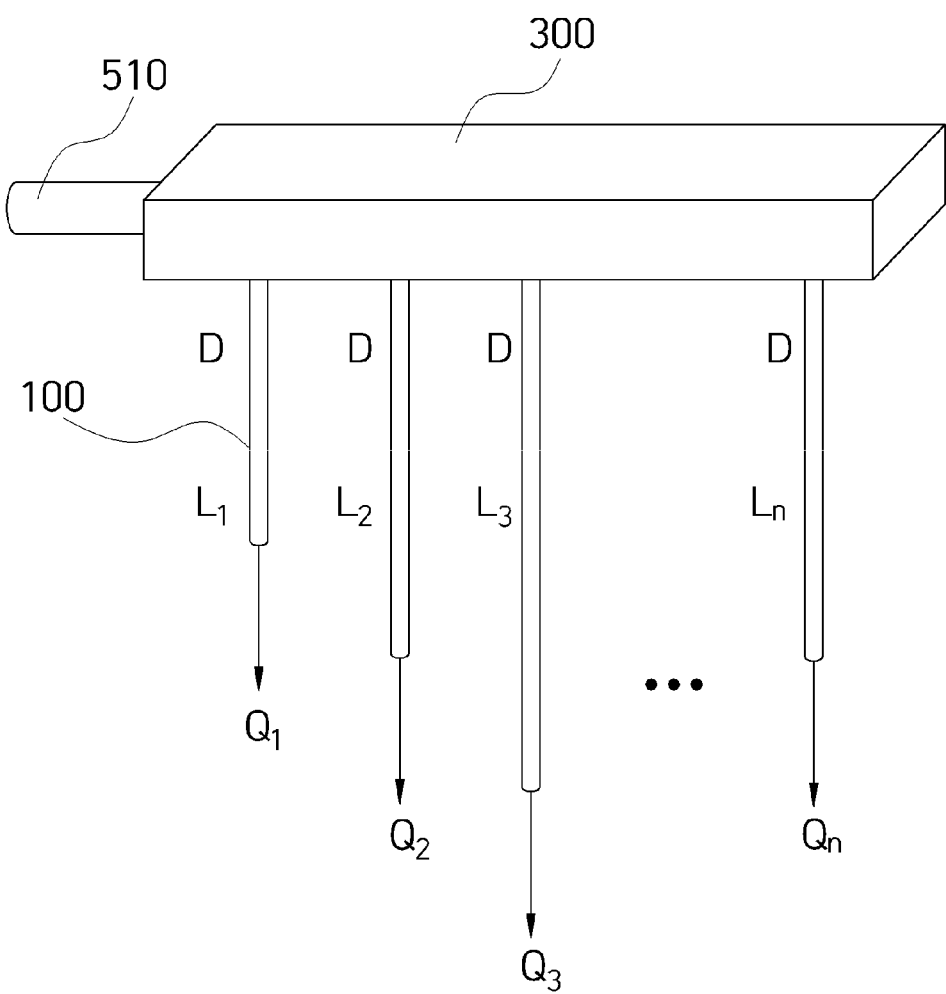
FIG. 2B is a conceptual view illustrating flow rates according to gas divergence flow channels having different lengths in the multi-port gas flow rate control apparatus according to one embodiment of the present invention.

FIG. 2B is a conceptual view illustrating flow rates according to gas divergence flow channels having different lengths in the multi-port gas flow rate control apparatus according to one embodiment of the present invention.

The plurality of gas divergence flow channels 100-1 to 100-n according to one embodiment of the present invention are configured to have different inner diameters or to have different lengths.

As shown in FIG. 1, the n number of gas sensors 400-1 to 400-n may have different gas flow rate ranges to obtain an optimum measurement result and thus it is necessary to control gas flow rates at the n number of flow channel outlet portions 120.

Generally, a gas flow regulator, for example, a mass flow controller is installed in the middle of the gas divergence flow channel 100 to precisely control a gas flow. However, since it is necessary to install a plurality of gas flow channel regulators when a plurality of flow channels to be regulated are present, there is a problem that a cost and volume of an apparatus increase.

In one embodiment of the present invention, a method of adjusting a gas flow rate by adjusting flow resistance in a flow channel is applied.

That is, referring to FIG. 2A, flow rates Q in the n number of gas divergence flow channels 100-1 to 100-n which diverge from one gas supply chamber 300 and have equal lengths L and different inner diameters D are illustrated.

Referring to FIG. 2B, flow rates Q in the n number of gas divergence flow channels 100-1 to 100-n which diverge from one gas supply chamber 300 and have equal inner diameters D and different lengths L are illustrated.

Generally, a pressure drop ΔP in each of the gas divergence flow channels 100-1 to 100-n which have a circular cross section when a flow is a laminar flow is expressed as [Equation 1].

$$\Delta P = \frac{32\mu VL}{D^2} \quad \text{[Equation 1]}$$

Here, ΔP denotes a pressure drop of a flow, D denotes an inner diameter of a flow channel, V denotes a velocity of a fluid, L denotes a length of a flow channel, and g denotes a viscosity coefficient of the fluid.

In [Equation 1], the pressure drop is proportional to the velocity and the length and is inversely proportional to the square of the inner diameter. That is, when a gas divergence flow channel has a small inner diameter or a long length, a large pressure drop occurs.

In one embodiment of the present invention, in order to control a flow rate of the flow channel, gas flow rates at multi-ports may be estimated by allowing most of a pressure drop in a gas flow path to occur in a flow channel.

That is, most of a pressure drop is allowed to occur in the flow channel by creating a case in which a cross-sectional area of each of the flow channels is very small in comparison to a size of the gas supply chamber 300 from which the plurality of flow channels diverge and a size of the measurement space 211 at which the flow channels join so that differences may be made in flow rates of the plurality of flow channels.

To this end, the gas divergence flow channel may have an inner diameter of 0.1 to 1 mm. In contrast, to allow pressure drops to mostly occur in the gas divergence flow channels as described above, the gas supply chamber 300 and the measurement space 211 may have a minimum characteristic length (a height and the like of the gas measurement chamber) of 5 mm or more.

Also, the length of the gas divergence flow channel may be 5 to 100 cm and may be adjusted according to the numbers of gas sensors and flow channels.

Meanwhile, in the case of a flow occurring in the gas divergence flow channel, a laminar flow occurs when the Reynolds number Re is 2300 or less. Here, the Reynolds number is expressed as [Equation 2].

$$\text{Re} = \frac{\rho VD}{\mu} \quad \text{[Equation 2]}$$

Here, Re denotes the Reynolds number, ρ denotes the density of a gas, V denotes a velocity of a fluid, D denotes an inner diameter of a flow channel, and μ denotes a viscosity coefficient of the fluid.

When a fluid flow channel is formed to have a small inner diameter to increase a pressure drop in the fluid flow channel like the present invention, the Reynolds number Re falls within a laminar flow range so that the theoretical prediction of [Equation 1] is applicable.

Referring to [Equation 1], the flow rate of the gas divergence flow channel is expressed as [Equation 3].

$$Q = VA = \frac{\pi D^2}{4}V = \frac{\pi D^4}{128\mu L}\Delta P \quad \text{[Equation 3]}$$

Here, Q denotes a flow rate, V denotes a velocity of a fluid, A is a cross-sectional area of the flow channel, D denotes an inner diameter of the gas divergence flow channel, L denotes a length of the gas divergence flow channel, and ΔP denotes a pressure drop of a flow.

Referring to [Equation 3], with respect to the same pressure drop, an outflow flow rate is inversely proportional to the length L and is proportional to the fourth power of the inner diameter D of the flow channel. That is, in the case in which the flow channels have equal inner diameters (refer to FIG. 2B), when a length is doubled, a flow rate is halved.

Also, in the case of the flow channels having the same length (refer to FIG. 2A), when an inner diameter is halved, a flow rate becomes $1/16$. Accordingly, a variety of flow rates may be formed in a variety of flow channels by allowing flow channels to have different lengths or different inner diameters.

Meanwhile, as described above, in the present invention, when sizes of the gas supply chamber 300 and the measurement space 211 are formed to relatively large characteristic lengths in comparison to the flow channels so that pressure drops mostly occur in the flow channels due to small sizes of the flow channels, almost the same pressure drop occur in all the flow channels so that flow rate prediction of [Equation 3] is applicable.

Figure 3A:
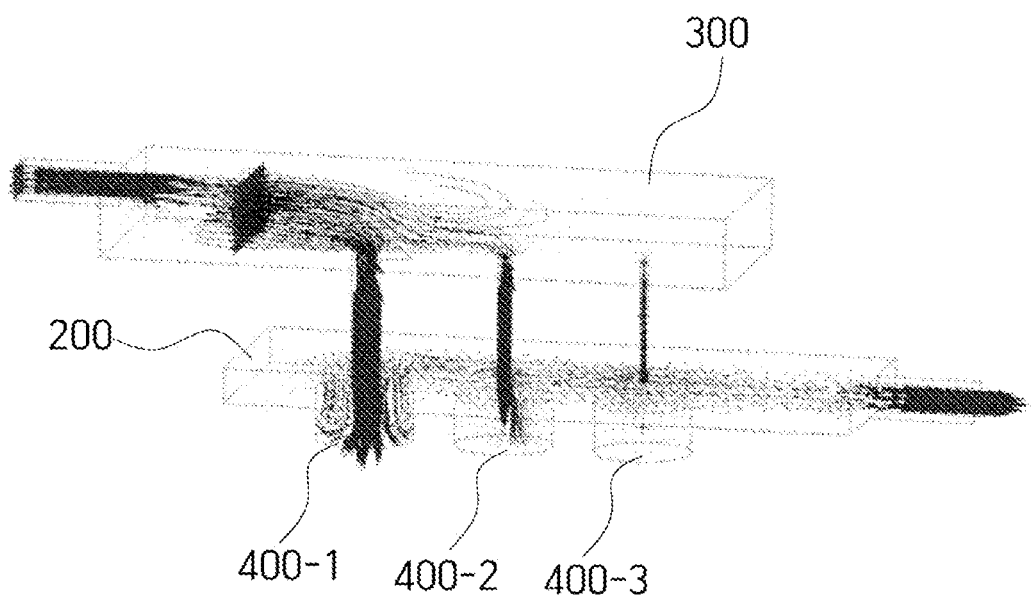
FIG. 3A illustrates an example among examples of computer simulation result with respect to gas flows in flow channels having different diameters, in which a fluid flow channel adjacent to an inflow channel has a larger inner diameter D and a fluid flow channel farther therefrom has a smaller inner diameter D.
Figure 3B:
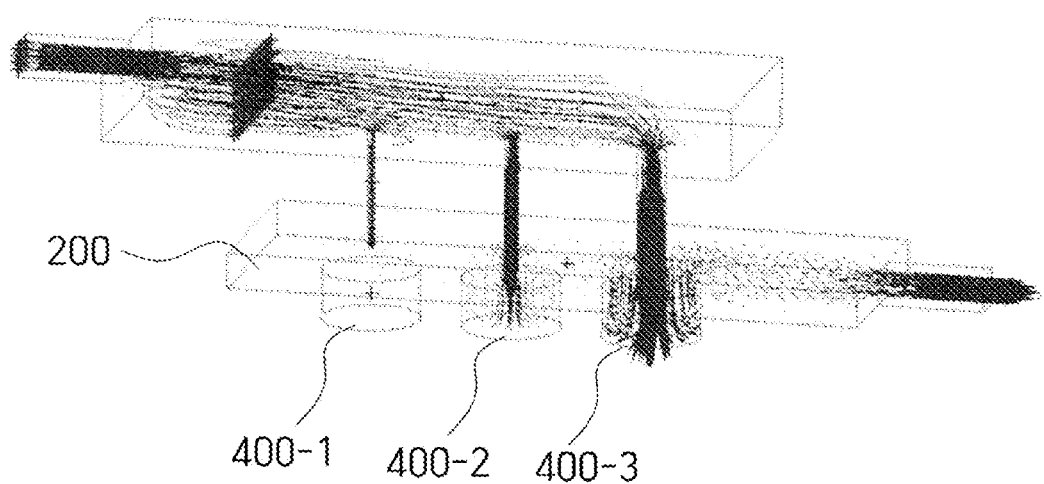
FIG. 3B illustrates an example among examples of computer simulation result with respect to gas flows in flow channels having different diameters, in which a fluid flow channel adjacent to an inflow channel has a smaller inner diameter D and a fluid flow channel farther therefrom has a larger inner diameter D.

FIG. 3A illustrates an example among examples of computer simulation results with respect to flow rates of flow channels having different inner diameters in which a fluid flow channel adjacent to an inflow channel has a large inner diameter D and a fluid flow channel farther therefrom has a smaller inner diameter D. FIG. 3B illustrates an example among examples of computer simulation results with respect to flow rates of flow channels having different inner diameters in which a fluid flow channel adjacent to an inflow channel has a small inner diameter D and a fluid flow channel farther therefrom has a larger inner diameter D.

As predicted from the theoretical formula, it may be seen that a gas flow rate increases when a flow channel has a large inner diameter. Also, a result in which a pressure drop mostly occur in the gas divergence flow channel when sizes of the measurement space 211 and the gas supply chamber 300 are larger than an inner diameter of the gas divergence flow channel may be obtained.

FIGS. 4A and 4B are tables illustrating results of comparing the theoretical formula and computed simulation results for flow rates of flow channels having different lengths in one embodiment of the present invention.

The table illustrates comparison between results of the theoretical formula and computed simulation for a relative flow rate ratio Q/Q50 obtained when a certain flow rate of gas was supplied to one gas supply chamber, flow rates Q of gases flowing out through four flow channels diverging from the gas supply chamber which had different lengths 50 to 200 mm were obtained, and lengths of the flow channels increased on the basis of a case Q50 in which a length was 50 mm. The computer simulation result is obtained using quadrangular channels having a cross section of 1 mm*1 mm as the flow channels and using ammonia as the gas.

As the computer simulation result, the Reynolds number calculated on the basis of a flow velocity in the flow channel having a length of 50 mm is shown as 160 (top) and 15 (bottom). In consideration of the relative flow rate ratio, it can be seen that the theoretical prediction of [Equation 3] which describes a change in flow rate caused by a change in length of the flow channel approaches the result of computer simulation. Also, the comparison table illustrates that the theoretical formula [Equation 3] further coincides with the computer simulation result with respect to the change in flow rate as the Reynolds number decreases.

As shown in FIGS. 4A and 4B, through comparison between the computer simulation analysis result and the theoretical formula, gas flows in the plurality of diverging gas divergence flow channels 100-1 to 100-n may be theoretically predicted so that there is an effect of simply implementing flows at a variety of flow rates using a change in length or inner diameter of the flow channel.

Also, as shown in FIG. 1, the multi-port gas flow rate control apparatus according to one embodiment of the present invention is an apparatus configured to obtain gas flows at a variety of flow rates using a principle that a gas flow rate is inversely proportional to a length of a flow channel.

The flow channel inlet portion 110 and the flow channel outlet portion 120 according to one embodiment of the present invention may include an additional fastening device (not shown) so as to separate and then replace the gas divergence flow channel connected to the gas measurement chamber 200 and the gas supply chamber 300 with another gas divergence flow channel having a different length or inner diameter.

FIG. 5 is a cross-sectional view illustrating a multi-port gas flow rate control apparatus according to another embodiment of the present invention.

As shown in FIG. 5, the multi-port gas flow rate control apparatus according to another embodiment of the present invention will be described as an example of apparatus in which flow channels have uniform lengths L and different inner diameters D.

The multi-port gas flow rate control apparatus according to another embodiment of the present invention is an apparatus configured to obtain gas flows at a variety of flow rates using proportionability to the fourth power of an inner diameter of the gas divergence flow channel.

Although the measurement chamber upper structure 210 is used for allowing the flow channel outlet portion 120 to be fixedly installed in the example of FIG. 1, a gas divergence flow channel is not separately installed and a flow channel is formed by perforating the measurement chamber upper structure 210 in another embodiment of the present invention shown in FIG. 5.

Like the examples shown in FIGS. 1 and 5, in the multi-port gas flow rate control apparatus of the present invention, a variety of structural designs are applied to change lengths and inner diameters of the flow channels.

Also, in another embodiment of the present invention, a design for changing lengths and inner diameters of the flow channels at the same time may be applied. As described above, a change in size of the flow channel in the present invention is not limited to the examples shown in the drawings.

Figure 6A:
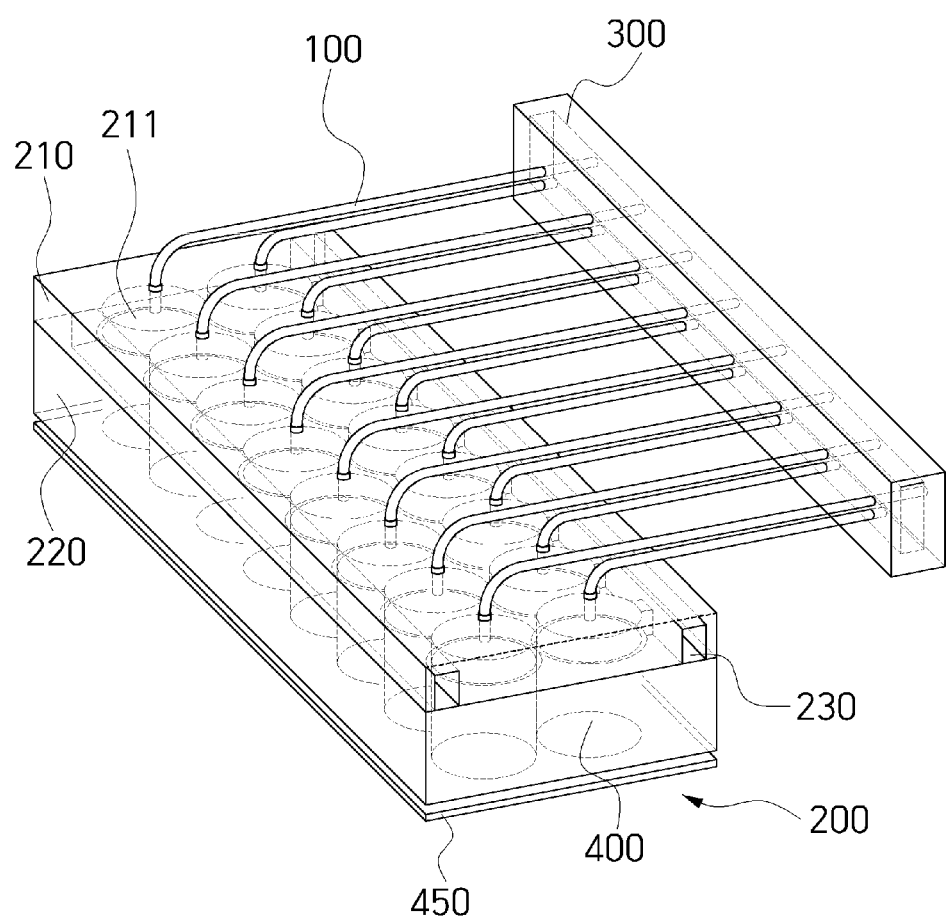
FIG. 6A is an exemplary view of a multi-port gas flow rate control apparatus in which lengths of flow channels are changed.
Figure 6B:
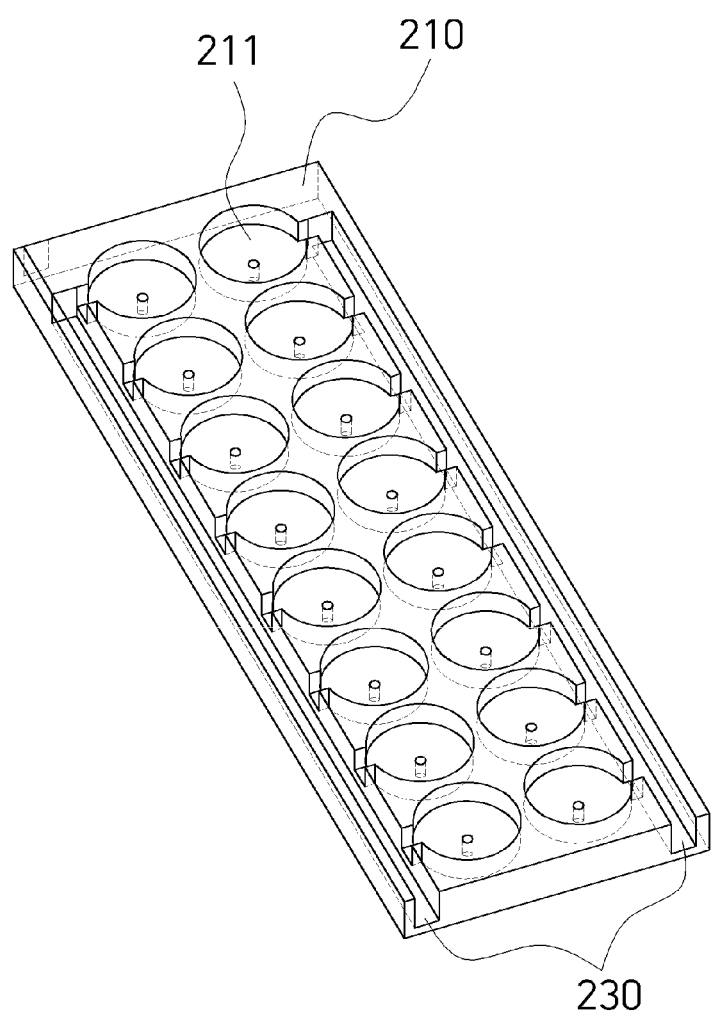
FIG. 6B is a view illustrating a measurement chamber upper structure in which a side channel is additionally formed.

FIG. 6A is an exemplary view of a multi-port gas flow rate control apparatus in which lengths of flow channels are changed, and FIG. 6B is a view illustrating a measurement chamber upper structure in which a side channel is additionally formed.

As shown in FIGS. 6A and 6B, in the multi-port gas flow rate control apparatus according to one embodiment of the present invention, sixteen flow channels 100-1 to 100-16 diverging from the gas supply chamber 300 in the form of a quadrangular chamber supply gases at different flow rates to sixteen gas sensors 400.

As described above, referring to FIG. 6A, lengths of the flow channels are changed according to required flow rates of the gas sensors 400-1 to 400-16 so as to supply the measurement gas to the measurement spaces 211 which are separate from each other.

The measurement gases are supplied to the gas sensors accommodated in the respective measurement spaces 211 at different flow rates and then join the side channel 230 formed in a side surface and flow outward.

Figure 7:
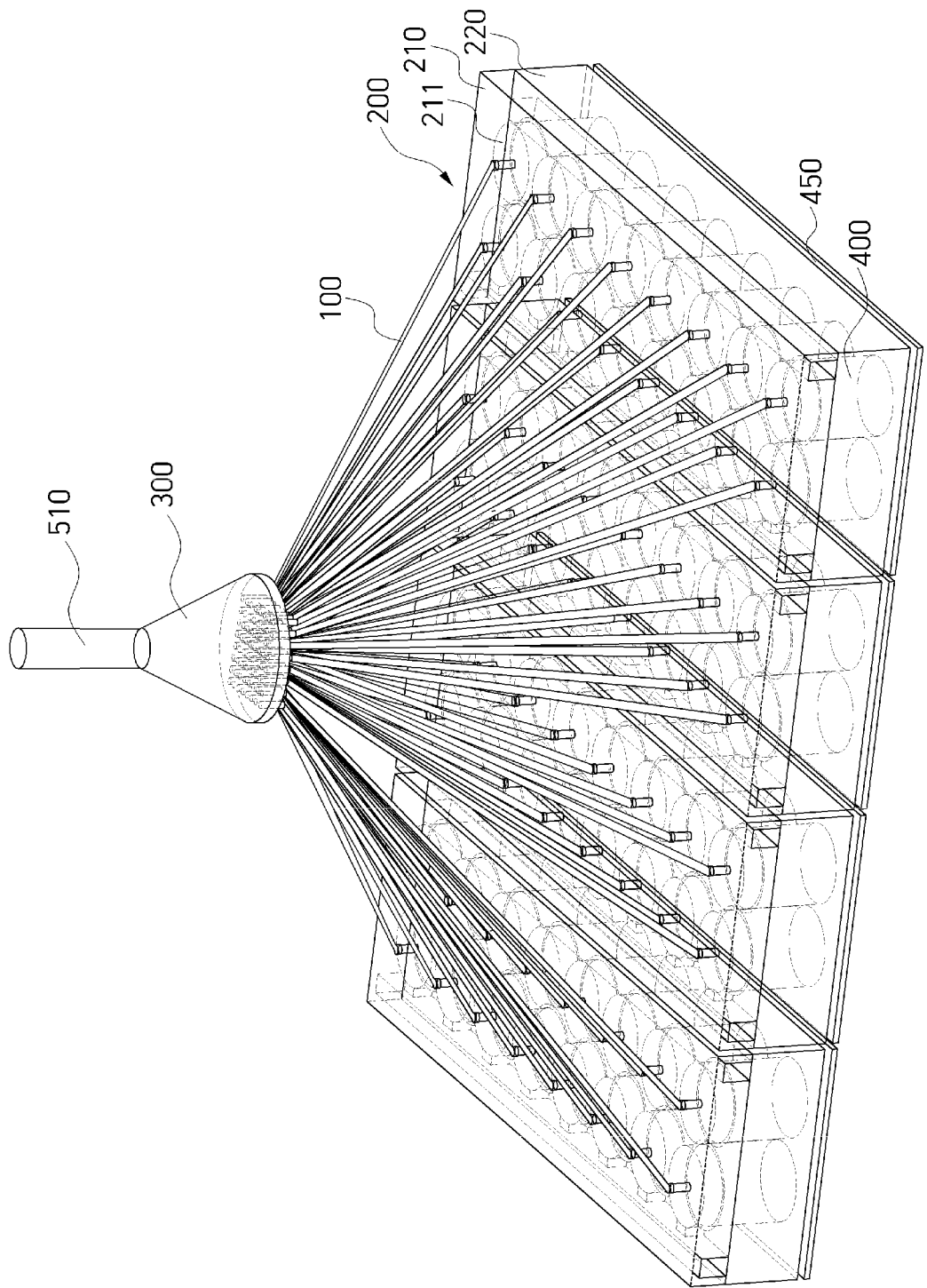
FIG. 7 is a view illustrating an example of the planar extension of a multi-port gas flow rate control apparatus in which the lengths of the flow channels in FIGS. 6A and 6B are changed.

FIG. 7 is a view illustrating an example of the planar extension of a multi-port gas flow rate control apparatus in which the lengths of the flow channels in FIGS. 6A and 6B are changed and which is formed by connecting four multi-port gas flow rate control apparatuses shown in FIGS. 6A and 6B in a plane so as to supply gases to eighty gas sensors at adjusted gas flow rates at the same time.

In addition, the eighty flow channels are collected and attached to a bottom surface of the gas supply chamber 300 connected to the gas inflow channel 510 and are distributed to the gas sensors 400 arranged in a plane.

Since it is necessary that a length of the gas divergence flow channel 100 is longer than or equal to a distance between the gas supply chamber 300 and the gas sensor 400, a design of disposing the gas sensor 400 which needs the long gas divergence flow channel 100 on an outer part is required.

Figure 8A:
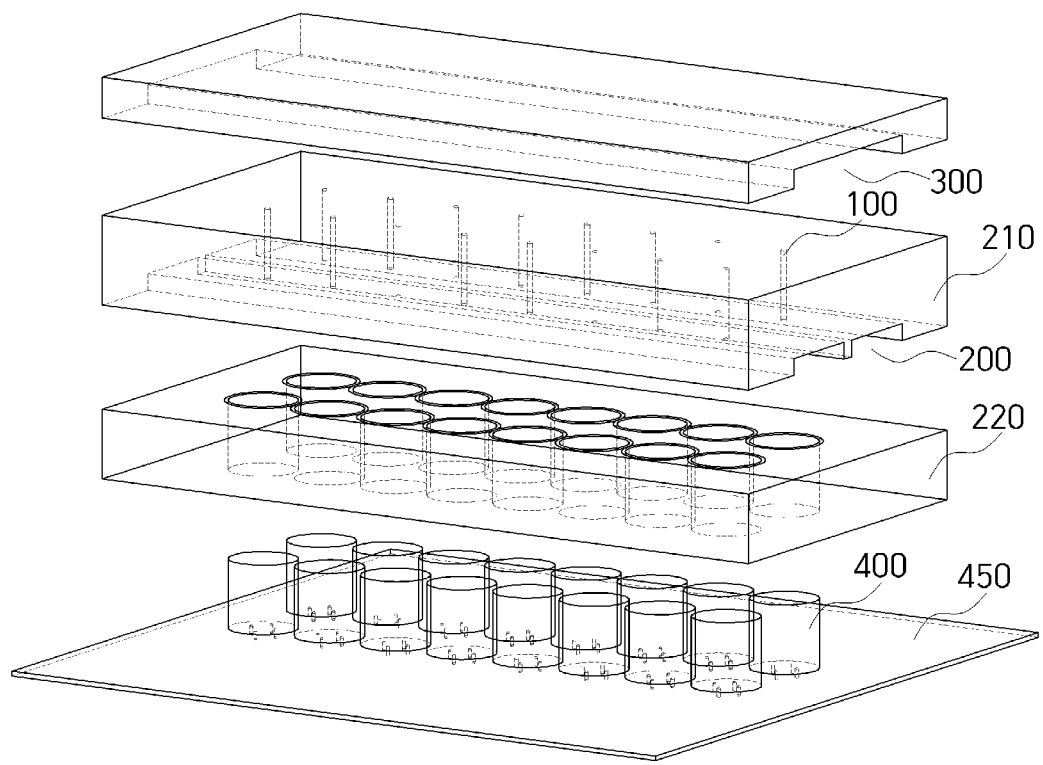
FIG. 8A is an exploded perspective view of a multi-port gas flow rate control apparatus in which flow channels are formed in the measurement chamber upper structure 210 illustrated in FIG. 5.
Figure 8B:
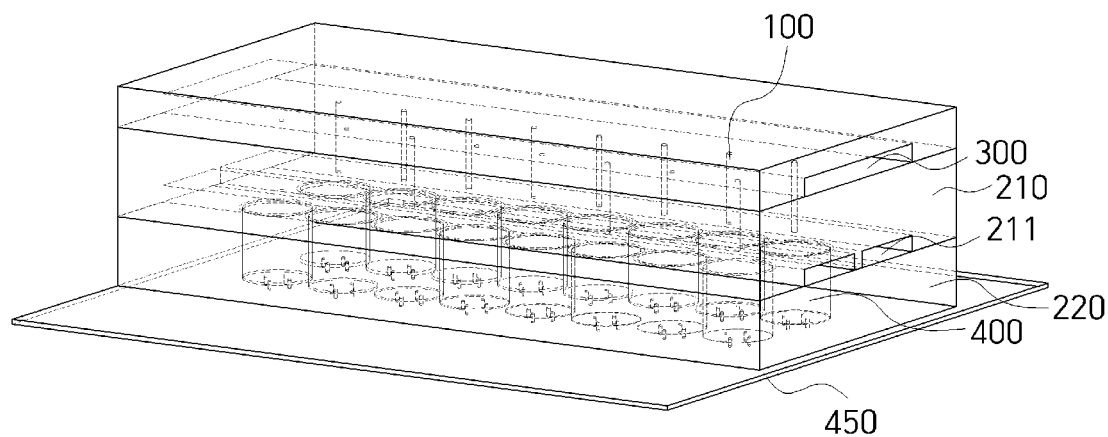
FIG. 8B is a coupled view of the multi-port gas flow rate control apparatus in which the flow channels are formed in the measurement chamber upper structure 210 illustrated in FIG. 5.

FIG. 8A is an exploded perspective view of a multi-port gas flow rate control apparatus in which fluid flow channels are formed in the measurement chamber upper structure 210 illustrated in FIG. 5, and FIG. 8B is a coupled view of the multi-port gas flow rate control apparatus in which the flow channels are formed in the measurement chamber upper structure 210 illustrated in FIG. 5.

As shown in FIGS. 8A and 8B, the multi-port gas flow rate control apparatus according to another embodiment of the present invention includes the gas supply chamber 300 and the gas measurement chamber 200.

The gas supply chamber 300 receives the measurement gas 50 through one gas inflow channel 510 and distributes and supplies the measurement gas 50 to the plurality of gas sensors 400-1 to 400-*n* accommodated in the gas measurement chamber 200.

The gas measurement chamber 200 is formed by combining the lower structure 220 including a plurality of accommodation holes accommodating the plurality of gas sensors 400-1 to 400-*n* and the upper structure 210 in which a plurality of gas divergence flow channel 100 having a hole shape and configured to connect the gas supply chamber 300 to the accommodation holes of the lower structure 220 so as to distribute and supply the measurement gas 50 supplied through the gas supply chamber 300 to the plurality of gas sensors 400-1 to 400-*n* accommodated in the lower structure 220.

In the upper structure 210, the flow channel outlet portions 120 of the plurality of gas divergence flow channels 100-1 to 100-*n* are fixedly installed, the measurement space 211 into which the measurement gas flowing in through the gas divergence flow channels 100-1 to 100-*n* flow is formed, and the channel 230 communicating with the measurement space 211 is formed in a side to allow the measurement gas 50 flowing into the measurement space 211 to be measured by the gas sensors 400-1 to 400-*n* and then discharged.

The lower structure 220 includes an accommodation portion configured to accommodate the plurality of gas sensors 400-1 to 400-*n*.

Meanwhile, the measurement space 211 is formed by combining the upper structure 210 and the lower structure 220. Also, bottom surfaces of the gas sensors 400 accommodated in the accommodation portion of the lower structure 220 may be exposed to the measurement space 211, but measurement sensor portions of the gas sensors 400-1 to 400-*n* may protrude into the gas measurement chamber 200 as necessary.

As shown in FIG. 8A, there is an example in which the plurality of gas sensors 400 are installed on a signal processing board 450 and inserted into the accommodation holes of the measurement chamber lower structure 220 so that upper measurement portions of the gas sensors 400 are exposed to bottoms of two measurement spaces 211 with no diaphragm.

As described above, in the multi-port gas flow rate control apparatus according to another embodiment of the present invention, sixteen flow channels have different inner diameters so as to supply the measurement gas at different flow rates to the respective gas sensors. FIG. 8B is a coupled view illustrating a coupled multi-layer structure of FIG. 8A which is coupled to prevent a gas leakage.

Figure 9A:
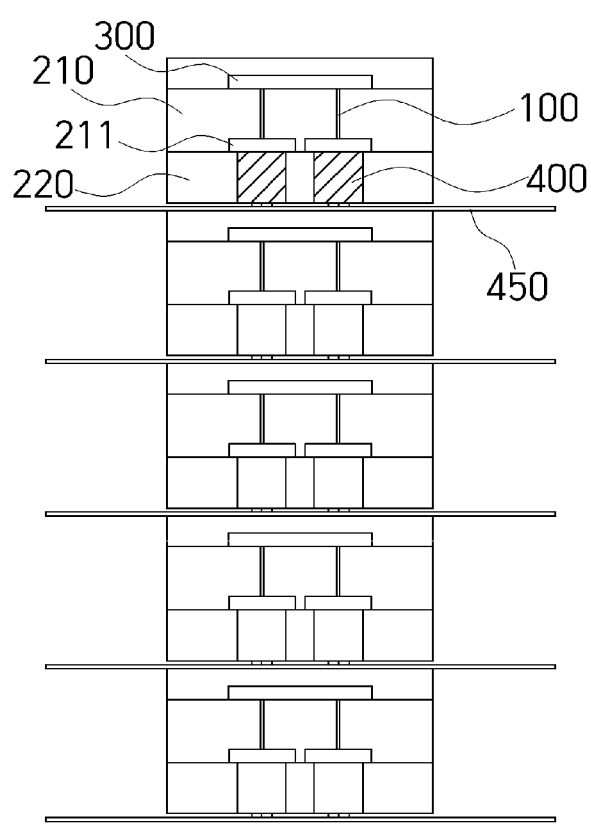
FIG. 9A is a front cross-sectional view illustrating a plurality of multi-port gas flow rate control apparatuses shown in FIGS. 8A and 8B which are stacked.

FIG. 9A is a front cross-sectional view illustrating a plurality of multi-port gas flow rate control apparatuses shown in FIGS. 8A and 8B which are stacked.

Figure 9B:
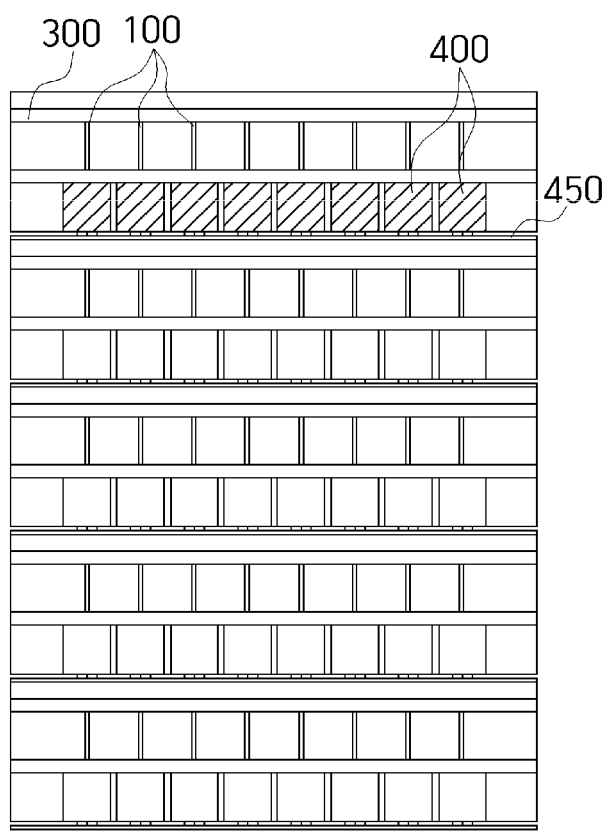
FIG. 9B is a side cross-sectional view illustrating the plurality of multi-port gas flow rate control apparatuses shown in FIGS. 8A and 8B which are stacked.

FIG. 9B is a side cross-sectional view illustrating the plurality of multi-port gas flow rate control apparatuses shown in FIGS. 8A and 8B which are stacked.

The multi-port gas flow rate control apparatus shown in FIGS. 8A and 8B includes sixteen gas sensors, and a plurality of such structures of FIGS. 8A and 8B may be arranged in a plane or in a height direction to extend the number of gas sensor.

This may be variously changed according to convenience of design and spatial requirements of the apparatus. FIGS. 9A and 9B are front and side cross-sectional views illustrating an example in which five structures of FIGS. 8A and 8B are stacked in the height direction.

According to this configuration, the number of gas sensors may be increased and a measurement gas supplied from one inlet may be supplied, at a variety of flow rates, to a plurality of gas sensors.

A multi-port gas flow rate control apparatus according to still another embodiment of the present invention will be described with reference to FIG. 10.

Figure 10:
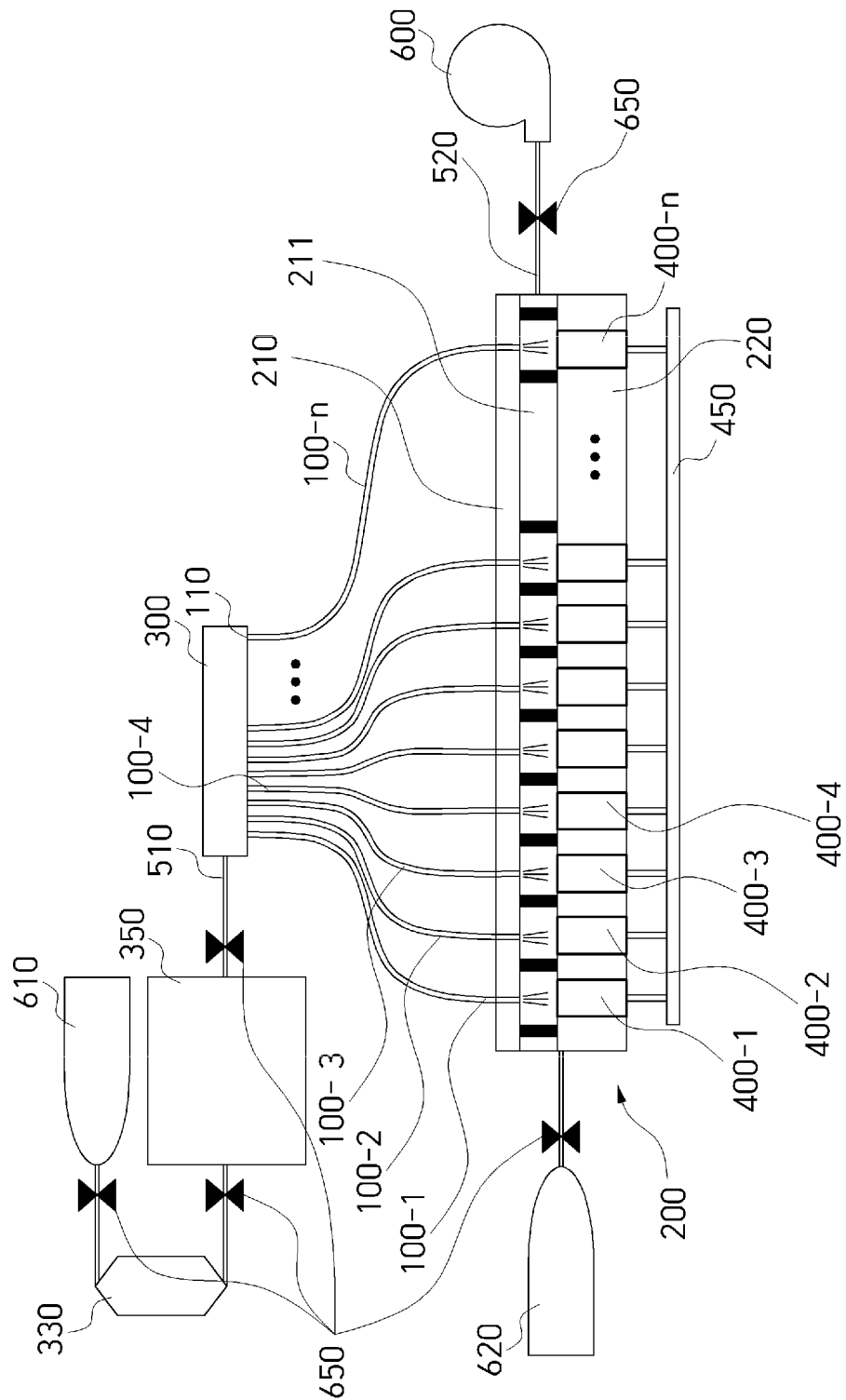
FIG. 10 is an exemplary view illustrating an apparatus to which a module is added so as to actually implement the multi-port gas flow rate control apparatus according to still another embodiment of the present invention.

FIG. 10 is an exemplary view illustrating an apparatus to which a module is added so as to actually implement the multi-port gas flow rate control apparatus according to still another embodiment of the present invention.

As shown in FIG. 10, in addition to the plurality of gas divergence flow channels 100-1 to 100-*n*, the gas measurement chamber 200, and the gas supply chamber 300 according to one embodiment of the present invention, a pretreatment unit 330, a suction pump 600, a measurement gas cylinder 610, and a purge gas cylinder 620 are further included.

The plurality of gas divergence flow channels 100-1 to 100-*n*, the gas measurement chamber 200, and the gas supply chamber 300 according to still another embodiment of the present invention perform the same functions as those of the one embodiment, and a detailed description thereof will be omitted in still another embodiment of the present invention.

The measurement gas cylinder 610 according to still another embodiment of the present invention stores a measurement gas and supplies the stored measurement gas to the gas measurement chamber 200.

Also, the pretreatment unit 330 is installed between the measurement gas cylinder 610 and the gas supply chamber 300 to concentrate the measurement gas or remove a particular gas component or moisture before measurement.

Also, in still another embodiment of the present invention, a pretreatment gas chamber 350 may be installed between the pretreatment unit 300 and the gas supply chamber 300.

The pretreatment gas chamber 350 performs a function of storing and supplying a certain amount of a pretreated gas or the measurement gas of the measurement gas cylinder to the gas supply chamber 300.

Also, in still another embodiment of the present invention, the purge gas cylinder 620 may be further included.

The purge gas cylinder 620 may be installed by being connected to one side of the measurement space 211 and supply a purge gas so as to initialize the measurement space 211 to a state before measurement.

Meanwhile, in still another embodiment of the present invention, the suction pump 600 may be installed on an end of the gas outflow channel 520 and may suction a gas for which sensing is completed, and a valve 650 configured to open or close a gas suction flow channel may be further disposed.

One or a plurality of modules added to implement the multi-port gas flow rate control apparatus according to still another embodiment of the present invention may be installed as necessary.

As an example of actually implementing the multi-port gas flow rate control apparatus in still another embodiment of the present invention, according to the purpose of use and a method of applying an apparatus for supplying a measurement gas supplied through one inlet to a plurality of sensors at different flow rates, a module shown in the drawings may be omitted or a module not shown may be added.

A plurality of existing flow rate control apparatuses are installed to allow a gas supplied from one inlet to be supplied at different flow rates to a plurality of sensors such that an installation may become complicated and a cost thereof may increase. However, in the present invention, there is an effect of simply adjusting a flow rate by changing flow resistance by adjusting a shape of a flow channel.

According to one embodiment of the present invention, since a flow channel or a channel-shaped structure is replaceably applied, there is an effect of changing flow resistance by simply adjusting a shape of a flow channel.

Also, according to one embodiment of the present invention, there are an effect of reducing a cost of an apparatus by simplifying a flow rate adjusting apparatus and an effect of miniaturizing a size of the apparatus.

Although the configurations of the present invention have been described above in detail, these are merely an example and a variety of modifications and changes may be made by one of ordinary skill in the art to which the present invention pertains. Accordingly, the scope of the present invention is not limited to the above embodiments and should be defined by the following claims.

What is claimed is:

1. A multi-port gas flow rate control apparatus comprising:
a gas supply chamber configured to supply a measurement gas input through one gas inflow channel while allowing the measurement gas to diverge into a plurality of flows;
a plurality of gas divergence flow channels each having one side connected to the gas supply chamber and configured to transfer the measurement gas flowing through the gas supply chamber to a plurality of gas sensors, respectively;
a gas measurement chamber configured to accommodate the plurality of gas sensors, comprising the plurality of gas divergence flow channels configured to connect the gas supply chamber to the plurality of gas sensors to transfer a gas outflow diverging through the gas supply chamber to the plurality of accommodated gas sensors, and configured to discharge the gas outflow sensed by the plurality of gas sensors;
a measurement gas cylinder configured to store the measurement gas and supply the stored measurement gas to the gas measurement chamber;
a pretreatment unit installed between the measurement gas cylinder and the gas supply chamber to concentrate the measurement gas or remove a particular gas component or moisture before measurement;
a purge gas cylinder connected to one side of measurement space and configured to supply a purge gas so as to initialize the measurement space to a state before the measurement;
a suction pump installed on an end of a gas outflow channel and configured to suction a gas for which sensing is completed; and
a valve configured to open or close a gas suction flow channel.

2. The multi-port gas flow rate control apparatus of claim 1, wherein the plurality of gas divergence flow channels are configured to have different inner diameters.

3. The multi-port gas flow rate control apparatus of claim 1, wherein the plurality of gas divergence flow channels are configured to have different lengths.

4. The multi-port gas flow rate control apparatus of claim 1, wherein each of the plurality of gas divergence flow channels has an inner diameter of 0.1 to 1 mm, and the gas supply chamber and the gas measurement chamber have minimum lengths of 5 mm or more.

5. The multi-port gas flow rate control apparatus of claim 1, wherein the gas supply chamber and the gas measurement chamber have minimum lengths of 5 mm or more.

6. A multi-port gas flow rate control apparatus comprising:
a gas supply chamber configured to receive a measurement gas through one gas inflow channel and to supply the measurement gas while allowing the measurement gas to diverge into a plurality of flows; and
a gas measurement chamber comprising a lower structure comprising a plurality of accommodation holes configured to accommodate a plurality of gas sensors and an upper structure in which a plurality of hole-shaped gas divergence flow channels configured to connect the gas supply chamber to the accommodation holes of the lower structure so as to allow the measurement gas supplied through the gas supply chamber to diverge and be supplied to the plurality of gas sensors accommodated in the lower structure;
a measurement gas cylinder configured to store the measurement gas and supply the stored measurement gas to the gas measurement chamber;
a pretreatment unit installed between the measurement gas cylinder and the gas supply chamber to concentrate the measurement gas or remove a particular gas component or moisture before measurement;
a purge gas cylinder connected to one side of measurement space and configured to supply a purge gas so as to initialize the measurement space to a state before the measurement;
a suction pump installed on an end of a gas outflow channel and configured to suction a gas for which sensing is completed; and
a valve configured to open or close a gas suction flow channel.

* * * * *